US008041548B2

(12) United States Patent
Kropaczek et al.

(10) Patent No.: US 8,041,548 B2
(45) Date of Patent: Oct. 18, 2011

(54) METHOD AND APPARATUS FOR EVALUATING A PROPOSED SOLUTION TO A CONSTRAINT PROBLEM FOR A NUCLEAR REACTOR INVOLVING CHANNEL DEFORMATION

(75) Inventors: David Joseph Kropaczek, Wilmington, NC (US); Atul Arun Karve, Wilmington, NC (US); Angelo Peter Chopelas, Wilmington, NC (US); Brian Moore, Wilmington, NC (US)

(73) Assignee: Global Nuclear Fuels-Americas, LLC, Wilmington, NC (US)

( * ) Notice: Subject to any disclaimer, the term of this patent is extended or adjusted under 35 U.S.C. 154(b) by 1281 days.

(21) Appl. No.: 11/024,433

(22) Filed: Dec. 30, 2004

(65) Prior Publication Data

US 2006/0149512 A1    Jul. 6, 2006

(51) Int. Cl.
 G06G 7/48 (2006.01)
 G05B 13/02 (2006.01)
 G21C 7/00 (2006.01)
(52) U.S. Cl. .................. 703/6; 703/2; 700/28; 376/327; 376/332; 376/333; 376/334; 376/335
(58) Field of Classification Search .................. 376/245, 376/327, 332–335; 703/2, 6; 700/28
See application file for complete search history.

(56) References Cited

U.S. PATENT DOCUMENTS

| 4,330,367 A | 5/1982 | Musick |
| 4,459,259 A | 7/1984 | Colley |
| 4,552,718 A | 11/1985 | Impink |
| 4,759,897 A * | 7/1988 | Tolino et al. .................. 376/245 |
| 4,853,175 A | 8/1989 | Book, Sr. |
| 4,988,476 A * | 1/1991 | Sadaoka et al. ................ 376/245 |
| 4,997,617 A | 3/1991 | Newton et al. |
| 5,009,833 A | 4/1991 | Takeuchi et al. |
| 5,023,045 A | 6/1991 | Watanabe et al. |
| 5,091,139 A | 2/1992 | Chao et al. |
| 5,171,516 A | 12/1992 | Iwamoto |
| 5,267,346 A | 11/1993 | Maruyama et al. |
| 5,272,736 A | 12/1993 | Wolters, Jr. et al. |
| 5,309,485 A | 5/1994 | Chao |
| 5,311,562 A | 5/1994 | Palusamy et al. |
| 5,392,320 A | 2/1995 | Chao |
| 5,438,527 A | 8/1995 | Feldbaumer et al. |

(Continued)

FOREIGN PATENT DOCUMENTS

DE          44 16 463         11/1994

(Continued)

OTHER PUBLICATIONS

Bäck, Thomas et al., "A Survey of Evolution Strategies", Proc. 4$^{th}$ Intl. Conf. Genetic Algorithms, 1991, pp. 2-9, Morgan Kauffman. (8 pp.).

(Continued)

*Primary Examiner* — Kamini S Shah
*Assistant Examiner* — Akash Saxena
(74) *Attorney, Agent, or Firm* — Hareness, Dickey & Pierce, P.L.C.

(57) ABSTRACT

A method of and a system for evaluating constraint functions for improving nuclear reactor performance involve generating an operational solution for a nuclear reactor using a constraint to account for a problem with the operation of the nuclear reactor. The problem is based at least in part on channel deformation criteria.

9 Claims, 4 Drawing Sheets

U.S. PATENT DOCUMENTS

| | | | |
|---|---|---|---|
| 5,530,867 A | | 6/1996 | Beran |
| 5,537,119 A * | | 7/1996 | Poore, Jr. .................. 342/96 |
| 5,630,070 A | | 5/1997 | Dietrich et al. |
| 5,631,939 A * | | 5/1997 | Haraguchi et al. ............ 376/349 |
| 5,636,328 A | | 6/1997 | Kautz et al. |
| 5,677,938 A * | | 10/1997 | Gassmann ................. 376/237 |
| 5,726,913 A | | 3/1998 | Grimsrud |
| 5,781,430 A | | 7/1998 | Tsai |
| 5,790,616 A * | | 8/1998 | Jackson ................. 376/245 |
| 5,790,618 A | | 8/1998 | Fawks, Jr. |
| 5,793,636 A | | 8/1998 | Cooney et al. |
| 5,812,622 A | | 9/1998 | Chang et al. |
| 5,855,009 A | | 12/1998 | Garcia et al. |
| 5,859,885 A | | 1/1999 | Rusnica et al. |
| 5,886,908 A * | | 3/1999 | Conn et al. .................. 703/2 |
| 5,912,933 A | | 6/1999 | Shaug et al. |
| 5,923,717 A * | | 7/1999 | Fawks, Jr. ................. 376/245 |
| 5,924,074 A | | 7/1999 | Evans |
| 5,940,816 A * | | 8/1999 | Fuhrer et al. ................. 706/13 |
| 6,018,732 A | | 1/2000 | Bertrand |
| 6,031,984 A | | 2/2000 | Walser |
| 6,216,109 B1 | | 4/2001 | Zweben et al. |
| 6,226,561 B1 * | | 5/2001 | Tamaki et al. ............... 700/100 |
| 6,272,483 B1 | | 8/2001 | Joslin et al. |
| 6,278,978 B1 | | 8/2001 | Andre et al. |
| 6,311,313 B1 | | 10/2001 | Camporese et al. |
| 6,345,240 B1 | | 2/2002 | Havens |
| 6,381,564 B1 * | | 4/2002 | Davis et al. .................. 703/22 |
| 6,404,437 B1 * | | 6/2002 | Russell et al. ............... 345/473 |
| 6,674,825 B2 * | | 1/2004 | Bolger et al. ................ 376/216 |
| 6,748,348 B1 * | | 6/2004 | Russell, II ................... 703/6 |
| 6,862,329 B1 * | | 3/2005 | Kropaczek et al. .......... 376/267 |
| 6,912,515 B2 | | 6/2005 | Jackson et al. |
| 7,437,276 B2 * | | 10/2008 | Kropaczek et al. ............. 703/6 |
| 7,487,133 B2 * | | 2/2009 | Kropaczek et al. ............ 700/28 |
| 2003/0086520 A1 | | 5/2003 | Russell, II et al. ............ 376/256 |
| 2004/0059549 A1 * | | 3/2004 | Kropaczek et al. ............. 703/2 |
| 2004/0059696 A1 * | | 3/2004 | Kropaczek et al. ............. 706/46 |
| 2004/0122629 A1 | | 6/2004 | Russell, II |
| 2004/0191734 A1 * | | 9/2004 | Russell et al. ............... 434/218 |

FOREIGN PATENT DOCUMENTS

| | | |
|---|---|---|
| DE | 198 45 988 | 4/1999 |
| DK | DE 44 16 463 | 11/1994 |
| EP | 0 786 782 A1 | 7/1997 |
| EP | 0 823 712 A1 | 2/1998 |
| EP | 1 400 905 | 3/2004 |
| EP | 1400905 A1 * | 3/2004 |
| JP | 04-132995 | 5/1992 |
| JP | 6 347586 | 12/1994 |
| JP | 2004-110831 | 4/2004 |
| SE | 9301613 | 11/1994 |

OTHER PUBLICATIONS

Coit, David W., et al., "Adaptive Penalty Methods for Genetic Optimization of Constrained Combinatorial Problems", INFORMS Journal on Computing, 1996, vol. 8, No. 2, pp. 173-182. (10 pp.).

Eiben, A. E., et al., "SAW-ing EAs: adapting the fitness function for solving constrained problems", CiteSeer, 1999, pp. 1-21. (21 pp.).

Hadj-Alouane, A.B., et al., "A Genetic Algorithm for the Multiple-Choice Integer Program", JSTOR, Operations Research, 1997, cover page and pp. 92-101, vol. 45, No. 1. (11 pp.).

Hamida, S. Ben, et al., "The need for improving the exploration operators for constrained optimization problems", Proc. of the 2000 Congress on Evolutionary Computation, 2000, pp. 1176-1183, IEEE, San Diego. (8 pp.).

Homaifar, A., et al., "Constrained Optimization Via Genetic Algorithms", Simulation, Apr. 1994, pp. 242-253. (12 pp.).

Joines, Jeffrey A., et al., "On the Use of Non-Stationary Penalty Functions to Solve Nonlinear Constrained Optimization Problems with GA's", Proc. $1^{st}$ IEEE Intl. Conf. Evolutionary Computation, pp. 579-584, 1994, IEEE. (6 pp.).

Karve, Atul A., et al., "FORMOSA-B: A Boiling Water Reactor In-Core Fuel Management Optimization Package II", Nuclear Technology, Jul. 2000, vol. 131, pp. 48-68. (21 pp.).

Michalewicz, Zbigniew, et al., "Genocop III: A Co-evolutionary Algorithm for Numerical Optimization Problems with Nonlinear Constraints", Proc. Second IEEE Intl. Conf. Evolutionary Computation, 1995, pp. 647-651, IEEE. (5 pp.).

Moore, Brian R., et al., "FORMOSA-B: A Boiling Water Reactor In-Core Fuel Management Optimization Package", Nuclear Technology, vol. 126, May 1999, pp. 153-169. (17 pp.).

Schoenauer, Marc, et al., "Evolutionary Computation at the Edge of Feasibility", Proc. $4^{th}$ Conf. Parallel Problems Solving from Nature, Springer-Verlag, 1996, pp. 573-580. (10 pp.).

Eiben, A. E. et al., "Self-adaptivity for constraint satisfaction: Learning Penalty Functions", IEEE, 1996, pp. 258-261. (4 pp.).

Khuri et al., "The Zero/One Multiple Knapsack Problem and Genetic Algorithms", ACM, 1994, pp. 188-193. (5 pp.).

Velasco, S., et al., "Optimization of heat engines including the saving of natural resources and the reduction of thermal pollution", J. Phys. D: Appl. Phys., vol. 33, 2000, pp. 355-359. (5 pp.).

Tamaki, Hisashi, et al., "A Genetic Algorithm Approach to Multi-Objective Scheduling Problems with Earliness and Tardiness Penalties", IEEE, 1999, pp. 46-52. (7 pp.).

Van De Bout, D. E., et al., "A traveling salesman objective function that works", Neural Networks, IEEE International Conference on Jul. 24-27, 1988, vol. 2, 1988, pp. 299-303. (5 pp.).

Pintér, János, "Global Optimization", MathWorld—A Wolfram Web Resource, created by Eric W. Weisstein, Online, <http://mathworld.wolfram.com/GlobalOptimization.html>. (9 pp.).

Weisstein, Eric, "Merit Function", MathWorld—A Wolfram Web Resource, created by Eric W. Weisstein, Online, <http://mathworld.wolfram.com/MeritFunction.html>. (2 pp.).

Pintér, János, "Operations Research", MathWorld—A Wolfram Web Resource, created by Eric W. Weisstein, Online, <http://mathworld.wolfram.com/OperationsResearch.html>. (4 pp.).

Zitzler, Eckart, "Evolutionary Algorithms for Multiobjective Optimization", PHD Thesis Computer Engineering and Networks Laboratory, Nov. 11, 1999, cover pages and pp. 5-13 (Chapter 1). (11 pp.).

Nangia, U., et al., "Optimal weight assessment based on a range of objectives in a multiobjective optimal load flow study", Generation, Transmission and Distribution, IEE Proceedings, IEEE, Jan. 1998, vol. 145, No. 1, pp. 65-69. (5 pp.).

Eiselt, Horst A., et al., "Combinatorial Optimization Problems with Soft and Hard Requirements", JSTOR, The Journal of the Operational Research Society, vol. 38, No. 9, Sep. 1987, pp. 785-795. (12 pp.).

Mexican Office Action dated Mar. 17, 2011 issued in connection with corresponding MX Application No. PA/a/2006/000105, with unofficial English translation.

* cited by examiner

FIG. 3 ePrometheus - Hatch 1 - Cycle 1 - Test 5b - CS10:2671 <Online Operation>

WorkSpace  Input  Run  View  Reports  Window  Help

Input Deck

| Plant Configuration | Optimization Configuration | Optimization Constraints | Operations Configuration | Fuel Shuffling | Eigenvalue & Operating Limit | Select Files |

Optimization Configuration

| Constraint Description | Importance | Exposure Dependence | Design Value | Objective Add Funct. | Optimization Credits |
|---|---|---|---|---|---|
| Maximum MFLCPR | Nominal | ☐ | Edit | 0.964 | ☐ | None |
| Maximum MFLPD | Nominal | ☐ | Edit | 0.957 | ☐ | None |
| Maximum MAPLHGR | Nominal | ☐ | Edit | 0.957 | ☐ | None |
| Minimum % Flow | Nominal | ☐ | Edit | 85.0 | ☐ | None |
| Maximum % Flow | None | ☐ | Edit | 100.0 | ☐ | None |
| Maximum Number Bundle Movements | None | ☐ | Edit | 300 | ☐ | None |
| Eigenvalue Lower Tolerance (ΔCycle) | | ☐ | Edit | 1.0E-4 | | |

Labels: 50, 56, 58, 52, 54

METHOD AND APPARATUS FOR EVALUATING A PROPOSED SOLUTION TO A CONSTRAINT PROBLEM FOR A NUCLEAR REACTOR INVOLVING CHANNEL DEFORMATION

BACKGROUND OF THE INVENTION

Most problems encountered in engineering design are non-linear by nature and involve the determination of system parameters that satisfy certain goals for the problem being solved. Such problems can be cast in the form of a mathematical optimization problem where a solution is desired that minimizes a system function or parameter subject to limitations or constraints on the system. Both the system function and constraints are comprised of system inputs (control variables) and system outputs, which may be either discrete or continuous. Furthermore, constraints may be equalities or inequalities. The solution to a given optimization problem has either or both of the following characteristics: 1) minimizes or maximizes a desired condition or conditions, thus satisfying the optimality condition and 2) satisfies the set of constraint equations imposed on the system.

With the above definitions, several categories of optimization problems may be defined. A Free Optimization Problem (FOP) is one for which no constraints exist. A Constraint Optimization Problem (COP) includes both, constraints and a "minimize" (or "maximize") condition(s) requirement. In contrast, a Constraint Satisfaction Problem (CSP) contains only constraints. Solving a CSP means finding feasible solution(s) within the search space that satisfies the constraint conditions. Solving a COP means finding a solution that is both feasible and optimal in the sense that a minimum (or maximum) value for the desired condition(s) is realized.

The solution to such a problem typically involves a mathematical search algorithm, whereby successively improved solutions are obtained over the course of a number of algorithm iterations. Each iteration, which can be thought of as a proposed solution, results in improvement of an objective function. An objective function is a mathematical expression having parameter values of a proposed solution as inputs. The objective function produces a figure of merit for the proposed solution. Comparison of objective function values provides a measure as to the relative strength of one solution versus another. Numerous search algorithms exist and differ in the manner by which the control variables for a particular problem are modified, whether a population of solutions or a single solution is tracked during the improvement process, and the assessment of convergence. However, these search algorithms rely on the results of an objective function in deciding a path of convergence. Examples of optimization algorithms include Genetic Algorithms, Simulated Annealing, and Tabu Search.

Within optimization algorithms, the critical issue of handling constraints for COPs and CSPs must be addressed. Several classes of methods exist for dealing with constraints. The most widespread method is the use of the penalty approach for modifying the objective function, which has the effect of converting a COP or CSP into a FOP. In this method, a penalty function, representing violations in the set of constraint equations, is added to an objective function characterizing the desired optimal condition. When the penalty function is positive, the solution is infeasible. When the penalty function is zero, all constraints are satisfied. Minimizing the modified objective function thus seeks not only optimality but also satisfaction of the constraints.

Objective functions take application specific forms, and therefore, each new problem or modification to a problem requires the construction of a new objective function. Furthermore, the objective function plays the important role of guiding an optimization algorithm to a possible best solution. Presumably, the better the objective function, the better the optimization result and/or the more efficient the optimization operation. Accordingly, a constant demand exists in the field of constraint-based problems for improved objective functions.

SUMMARY OF THE INVENTION

The invention provides a systematic and general method and apparatus for defining an objective function for Constrained Optimization Problems (COPs), Constraint Satisfaction Problems (CSPs) and Free Optimization Problems (FOPs), independent of the optimization search employed. The invention provides a generic definition of an objective function. Given the particular optimization problem (e.g., boiling water nuclear reactor core design, transportation scheduling, pressure water reactor core design, or any large scale, combinatorial optimization problem in discrete or continuous space), the objective function is configured following the generic definition.

Specifically, the generic definition of the objective function according to the present invention is a sum of credit components plus a sum of penalty components. Each credit component includes a credit term times an associated credit weight. Each penalty term includes a penalty term times an associated penalty weight. A credit term is a mathematical expression representing an optimization parameter, and a penalty term is a mathematical expression representing an optimization constraint.

Configuring an objective function involves establishing the number of credit and penalty components, establishing the mathematical expressions for the credit and penalty terms and establishing the initial weights of the credit and penalty weights. At least one of the penalty terms is based on a channel deformation criteria. This is accomplished through user input or by accessing a previously stored configured objective function.

The configured objective function may then be usable as part of an optimization process, or may be usable as a tool when a user assesses a candidate solution to an optimization problem. Because of the flexibility of the invention, changes in optimality conditions, constraint term definitions, and weight factors are readily accommodated.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting on the present invention and wherein.

DETAILED DESCRIPTION OF THE EMBODIMENTS

The Generic Objective Function

The present invention provides a generic definition of an objective function, which is applicable across a wide variety of constraint and optimization problems. Namely, the generic objective function is applicable to any large scale, combinatorial optimization problem in discrete or continuous space such as boiling water reactor core design, pressurized water reactor core design, transportation scheduling, resource allocation, etc. The generic objective function is defined as a sum of credit and penalty components. A penalty component includes a penalty term multiplied by an associated penalty weight. A credit component includes a credit term multiplied by an associated credit weight. The credit terms represent the optimality conditions for the problem. The penalty terms represent the constraints for the problem. Each credit term is a mathematical expression that quantifies an optimality condition. Each penalty term is a mathematical expression that quantifies a constraint. Mathematically, this can be expressed as follows:

$$F_{obj} = \sum_m \lambda_m^{credit} C_m + \sum_n \lambda_n^{penalty} P_n$$

where,
$F_{obj}$=objective function
$C_m$=credit term m
$P_n$=penalty term n
$\lambda_m^{credit}$=weight factor credit term m
$\lambda_n^{penalty}$=weight factor penalty term n Credit and penalty terms may be defined by maximum (i.e. upper bounded) or minimum (i.e. lower bounded) values and can represent scalar or multi-dimensional values. The only requirements are: 1) the penalty terms must be positive for constraint violations and zero otherwise, and 2) in the absence of constraint violations, the credit terms are consistent with a minimization problem. Thus, minimizing the modified objective function solves the optimization problem.

As an example, consider an air-conditioning system where the optimization problem is to minimize the average air temperature within a room, yet assure that no region within the room exceeds a certain temperature. For this example, the credit would be the average air temperature within the room volume. The constraint would be a limit on the point-wise temperature distribution within the room, which, in the form of a penalty term, would be calculated as the average temperature violation. To obtain the average temperature violation one would sum the differences of actual and limiting temperature values for those points within the room that violate and divide by the total number of points. Alternatively, one could calculate the penalty term as the maximum value of the point-wise temperature violations within the room. The form of the generic objective function thus allows any number of credit and penalty terms to be defined in a general manner for the problem being solved.

Forms for the credit or penalty terms include, but are not limited to:

The maximum value within a data array;
The minimum value within a data array;
The average of values within a data array;
The integral of values within a data array;
The maximum of calculated differences between elements of a data array and the corresponding constraint limit, restricted to elements that violate;
The minimum of calculated differences between elements of a data array and the corresponding constraint limit, restricted to elements that violate;
The average of calculated differences between elements of a data array and the corresponding constraint limit, restricted to elements that violate; and
The integral of calculated differences between elements of a data array and the corresponding constraint limit, restricted to elements that violate.

A Generic Architecture for Implementing the Objective Function

Figure 1:
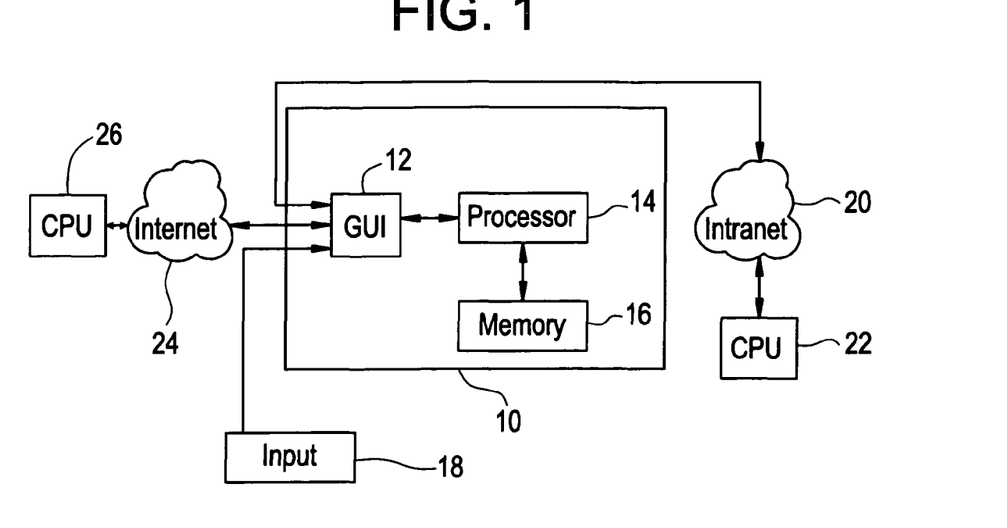
FIG. 1 illustrates an embodiment of an architecture according to the present invention for implementing the method of evaluating a proposed solution according to the present invention.

FIG. 1 illustrates an embodiment of an architecture according to the present invention for implementing the method of evaluating a proposed solution according to the present invention. As shown, a server 10 includes a graphical user interface 12 connected to a processor 14. The processor 14 is connected to a memory 16. The server 10 is directly accessible by a user input device 18 (e.g., a display, keyboard and mouse). The server 10 is also accessible by computers 22 and 26 over an intranet 20 and the Internet 24, respectively. The operation of the architecture shown in FIG. 1 will be discussed in detail below.

Configuring the Objective Function for an Optimization Problem

According to one embodiment, a configured objective function satisfying the above-described generic definition is already stored in the memory 16 of the server 10. For example, the configured objective function could have been configured according to one of the embodiments described below. In this embodiment, the user instructs the server 10 to provide a list of the configured objective functions stored in the memory 16, and instructs the server 10 to use one of the listed configured objective functions.

In another embodiment, a user via input 18, computer 26 or computer 22 accesses the server 10 over the graphical user interface 12. The user supplies the server 10 with a configured objective function meeting the definition of the above-described generic definition. In this embodiment, the user supplies the configured objective function using any well known programming language or program for expressing mathematical expressions. Specifically, the user instructs the processor 14 via the graphical user interface 12 to upload a file containing the configured objective function. The processor 14 then uploads the file, and stores the file in memory 16.

In still another embodiment, configuring the objective function is interactive between the user and the server 10. Here, the user instructs the processor 14 to start the process for configuring an objective function. The processor 14 then requests the user to identify the number of credit components and the number of penalty components. For each credit component, the processor 14 requests that the user provide a mathematical expression for the credit term and an initial weight for the associated credit weight. For each penalty component, the processor 14 requests that the user provide a mathematical expression for the penalty term and an initial weight for the associated penalty weight. In supplying the mathematical expression, the processor 14 via the graphical user interface 12 accepts definitions of mathematical expressions according to any well known programming language or program.

In another embodiment, the server 10 is preprogrammed for use on a particular constraint or optimization-based problem. In this embodiment, the server 10 stores possible optimization parameters and possible constraint parameters associated with the particular optimization or constraint problem. When a user instructs the processor 14 via the graphical user interface 12 to configure an objective function, the processor 14 accesses the possible optimization parameters already stored in the memory 16, and provides the user with the option of selecting one or more of the optimization parameters for optimization.

Figure 2:
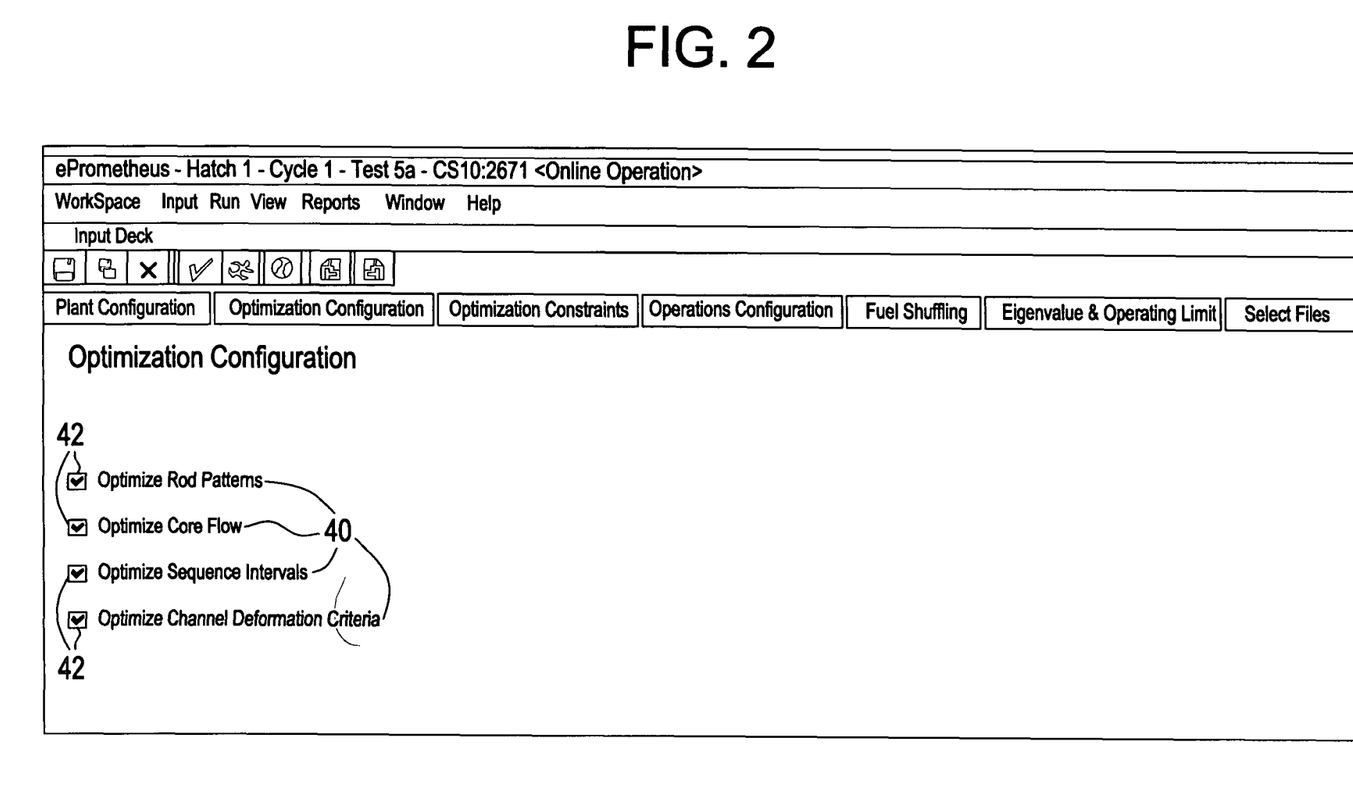
FIG. 2 illustrates a screen shot of an optimization configuration page used in selecting one or more optimization parameters associated with the optimization problem of boiling water reactor core design according to an embodiment of the present invention.

FIG. 2 illustrates a screen shot of an optimization configuration page used in selecting one or more optimization parameters associated with the optimization problem of boiling water reactor core design according to this embodiment of the present invention. As shown, the optimization parameters 40 of optimize rod patterns, optimize core flow, optimize sequence intervals, and optimize channel deformation criteria are available for selection by the user as optimization parameters. As is known, control blade (sometimes also referred to as control rods) positions affect the local power as well as the nuclear reaction rate within the fuel bundles. Optimize rod patterns means making an optimal determination of individual control rod or blade positions and rates of movement within a control blade grouping, for the duration of time during the operating cycle when a given sequence is being used to control the reactor. Sequences are time intervals during the reactor's cycle of operation. Generally, sequences may be a period of approximately 120 days, but the duration of sequences may be any period less than or equal to the nuclear reactor's cycle of operation.

Optimize core flow means making an optimal determination of reactor coolant flow rate through the reactor as a function of time during the operating cycle. Flow rate affects global reactor power as well as the nuclear reaction rate. Optimize sequence intervals means making an optimal determination of the time duration a given sequence is used to control the reactor during the operating cycle. Sequence intervals affect local power as well as the nuclear reaction rate.

Optimize channel deformation criteria means accounting for channel deformation (e.g., bow, bulge, or twist in the channel walls) for a next cycle of operation based on at least one of a proposed operational plan, a current operational plan, and current conditions (e.g., channel deformation conditions) within the core. Channel bow is the bowing of the channel walls, which surround a fuel bundle. A control blade moves between adjacent channel walls of adjacent fuel bundles and this movement may become obstructed by the channel walls. The channel bow phenomenon will be described in greater detail below with respect to FIG. 5.

Using the data input device 18, computer 22 or computer 26, each of which includes a display and a computer mouse, the user selects one or more of the optimization parameters by clicking in the selection box 42 associated with an optimization parameter 40. When selected, a check appears in the selection box 42 of the selected optimization parameter. Clicking in the selection box 42 again de-selects the optimization parameter.

Figure 3:
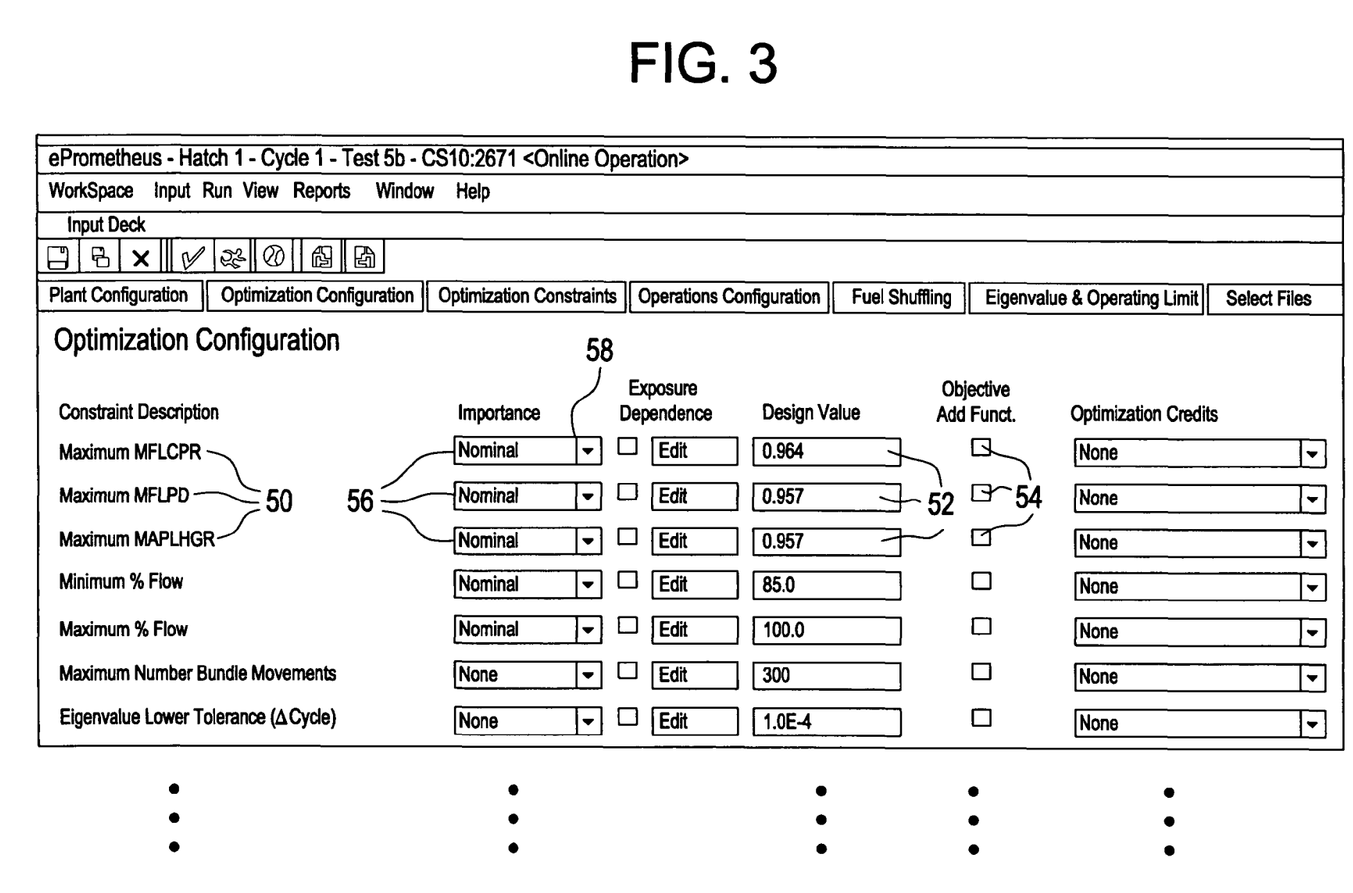
FIG. 3 illustrates a screen shot of an optimization constraints page listing optimization constraints associated with the optimization problem of boiling water reactor core design according to an embodiment of the present invention.

The memory 16 also stores constraint parameters associated with the optimization problem. The constraint parameters are parameters of the optimization problem that must or should satisfy a constraint or constraints. FIG. 3 illustrates a screen shot of an optimization constraints page listing optimization constraints associated with the optimization problem of boiling water reactor core design according to this embodiment of the present invention. As shown, each optimization constraint 50 has a design value 52 associated therewith. Optimization constraints may be below the specified design value if maximum valued or, alternatively, may be above the specified design value if minimum valued. The user has the ability to select optimization parameters for consideration in configuring the objective function. Using the data input device 18, computer 22 or computer 26, each of which includes a display and a computer mouse, the user selects an optimization constraint by clicking in the selection box 54 associated with an optimization constraint 50. When selected, a check appears in the selection box 54 of the selected optimization constraint 50. Clicking in the selection box 54 again de-selects the optimization constraint.

Each optimization parameter has a predetermined credit term and credit weight associated therewith that is stored in memory 16. Similarly, each optimization constraint has a predetermined penalty term and penalty weight associated therewith that is stored in memory 16. In the embodiment shown in FIG. 3, the penalty term incorporates the design value, and the user can change (i.e., configure) this value as desired. Additionally, the embodiment of FIG. 3 allows the user to set an importance 56 for each optimization constraint 50. In the importance field 58 for an optimization constraint, the user has pull-down options of minute, low, nominal, high and extreme. Each option correlates to an empirically predetermined penalty weight such that the greater the importance, the greater the predetermined penalty weight. In this manner, the user selects from among a set of predetermined penalty weights.

Once the above-selections have been completed, the processor 14 configures the objective function according to the generic definition discussed above and the selections made during the selection process. The resulting configured objective function equals the sum of credit components associated with the selected optimization parameters plus the sum of penalty components associated with the selected optimization constraints.

Additionally, the embodiment provides for the user to select a method of handling the credit and penalty weights. For example, the user is supplied with the possible methodologies of static, death penalty, dynamic, and adaptive for the penalty weights; is supplied with the possible methodologies of static, dynamic and adaptive for the credit weights; and the methodology of relative adaptive for both the penalty and credit weights. The well-known static methodology maintains the weights at their initially set values. The well-known death methodology sets each penalty weight to infinity. The well-known dynamic methodology adjusts the initial weight value during the course of the objective function's use in an optimization search based on a mathematical expression that determines the amount and/or frequency of the weight change. The well-known adaptive methodology is also applied during the course of an optimization search. In this method, penalty weight values are adjusted periodically for each constraint parameter that violates the design value. The relative adaptive methodology is disclosed in U.S. application Ser. No. 10/246,718, titled METHOD AND APPARATUS FOR ADAPTIVELY DETERMINING WEIGHT FAC- TORS WITHIN THE CONTEXT OF AN OBJECTIVE FUNCTION, by the inventors of the subject application.

Optimization using the Objective Function

Figure 4:
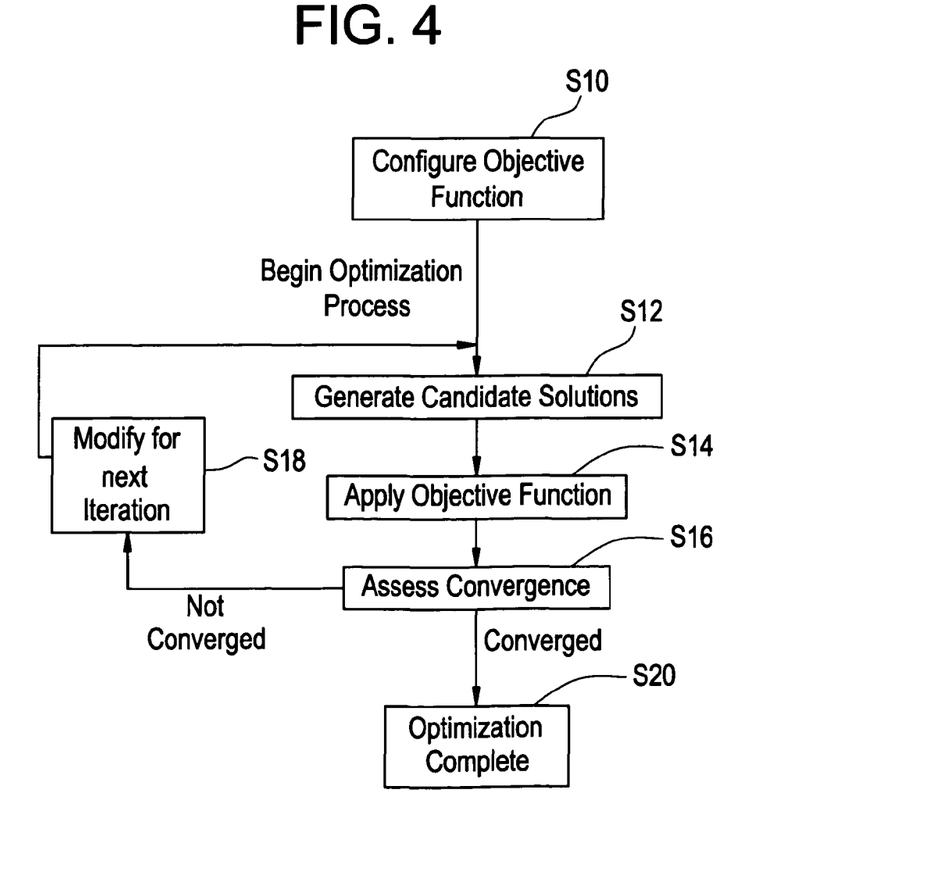
FIG. 4 illustrates a flow chart of an optimization process employing the objective function of the present invention.

FIG. 4 illustrates a flow chart showing one of the many uses for the objective function of the present invention. Specifically, FIG. 4 illustrates a flow chart of an optimization process employing the objective function of the present invention. For the purposes of explanation only, the optimization process of FIG. 4 will be described as being implemented by the architecture illustrated in FIG. 1. As shown, in step S10 the objective function is configured as discussed above in the preceding section, and then the optimization process begins. In step S12, the processor 14 retrieves from memory 16 or generates one or more sets of values for input parameters (i.e., system inputs) of the optimization problem based on the optimization algorithm in use. For example, for the optimization problem of boiling water reactor core design, some of the input parameters would be placement of fresh and exposed fuel bundles within the reactor, selection of the rod groups (sequences) and placement of the control rod positions within the groups as a function of time during the cycle, core flow as a function of time during a cycle, reactor coolant inlet pressure, etc. Each input parameter set of values is a candidate solution of the optimization problem. The processor 14 runs a simulated operation and generates a simulation result for each input parameter set of values. For example, for boiling water reactor core design, a well-known simulation program for boiling water reactor operation is run using an input parameter set. The simulation result includes values (i.e., system outputs) for the optimization parameters and optimization constraints. These values, or a subset of these values, are values of the variables in the mathematical expressions of the objective function.

Then, in step S14, the processor 14 uses the objective function and the system outputs to generate an objective function value for each candidate solution. In step S16, the processor 14 assesses whether the optimization process has converged upon a solution using the objective function values generated in step S14. If no convergence is reached, then in step S18, the input parameter sets are modified, the optimization iteration count is increased and processing returns to step S12. The generation, convergence assessment and modification operations of steps S12, S16 and S18 are performed according to any well-known optimization algorithm such as Genetic Algorithms, Simulated Annealing, and Tabu Search. When the optimization problem is boiling water reactor core design, the optimization algorithm can be, for example, one of the optimization processes as disclosed in U.S. patent Ser. No. 09/475,309, titled SYSTEM AND METHOD FOR OPTIMIZATION OF MULTIPLE OPERATIONAL CONTROL VARIABLES FOR A NUCLEAR REACTOR or U.S. application Ser. No. 09/683,004, tilted SYSTEM AND METHOD FOR CONTINUOUS OPTIMIZATION OF CONTROL-VARIABLES DURING OPERATION OF A NUCLEAR REACTOR, filed Nov. 7, 2001.

The Objective Function as a Tool

Before the advent of fairly successful optimization tools, generating viable solutions to an optimization problem fell on the shoulders of highly experienced individuals, who through years of practice and experience in a particular field, developed a set of skills for generating possible solutions to the optimization problem. Even today such practices continue. However, these individuals still need a reliable method for assessing their solutions. The objective function of the present invention provides such a tool.

Referring again to FIG. 1 for the purposes of explanation only, an individual desiring to apply an objective function according to the present invention accesses the server 10 via input 18, computer 26 or computer 22. The user then configures an objective function as described above; for example, the user accesses a previously stored configured objective function or configures the objective function through data entry. The user then supplies the values for the input variables of the objective function, and receives an objective function result. The user can perform this operation for different candidate solutions to obtain figures of merit regarding the solutions. In this manner, the user treats the objective function as a tool in determining a solution to the optimization problem.

The invention provides a systematic and general method for defining an objective function for Constrained Optimization Problems (COPs), Constraint Satisfaction Problems (CSPs) and Free Optimization Problems (FOPs), independent of the optimization search employed. The invention provides a mechanism within the context of the penalty function approach for addressing: 1) any number of constraints and optimality conditions, 2) different mathematical forms for the credit and penalty terms and 3) any number of dimensions in the candidate solution data and constraints. The invention provides a prescription for encoding objective function definitions within an optimization search through a software data module. Because of the flexibility of the invention, changes in optimality conditions, constraint term definitions, and weight factors are readily accommodated within the calling program simply by changing the data passed to the software data module.

The technical effort of the invention is a computer system that provides for configuring an objective function for a given optimization problem; a computer system that generates a possible solution for a particular optimization problem; and a computer system that allows internal and external users to measure the performance of their possible solutions to an optimization problem.

Optimization Including Channel Bow Criteria

Figure 5:
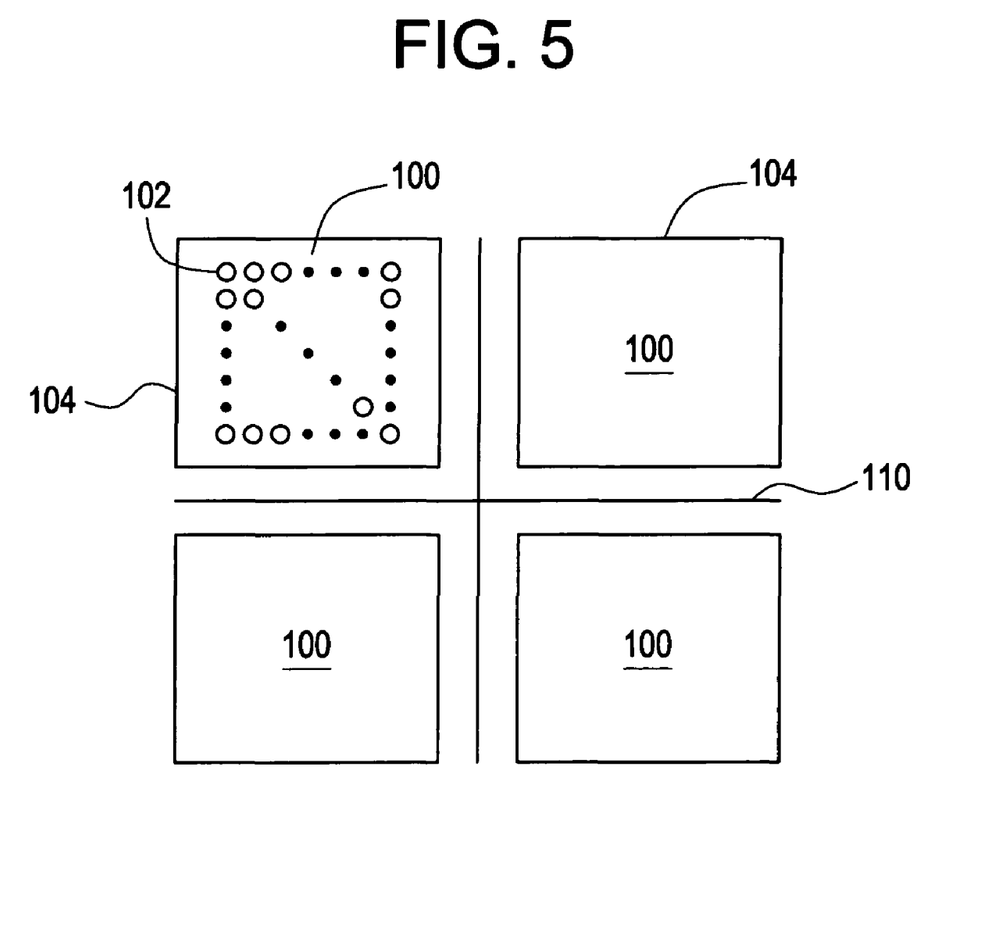
FIG. 5 illustrates a portion of a fuel bundle arrangement within a core.

FIG. 5 illustrates a portion of a fuel bundle arrangement within a core. The fuel bundles 100 within a core contain a plurality of fuel rods 102. Fuel rods 102 deliver fuel for the nuclear reaction during the operation or cycle of the reactor. The fuel bundles 100 may be analyzed using a loading map. The loading map sets forth the placement of fuel bundles 100 and their attributes (e.g., type, location, depth, serial number, etc. . . . ).

During the operation of the reactor, it is desirable to maintain a stable reactivity level to achieve a desired level of reactor performance. Accordingly, the reactor may include a plurality of control blades 110 positioned between fuel bundles. Control blades 110 may control the reactivity of the core (e.g., changing a position of a control blade 110 changes the reactivity of the core by slowing the nuclear reactions in a given proximity of the control blade 110). Generally, the control blades 110 may be moved mechanically to a deeper position within the core in order to decrease the core reactivity. Alternatively, the control blades 110 may be moved to a position further removed from the core in order to increase the core reactivity.

Each control blade 110 within the core may be positioned within a given range, the given range including a position furthest into the core at one extreme and a position furthest out of the core at another extreme. Within the range of control blade positioning, the control blade 110 may be moved to positions (referred to as "notches") that are a fixed interval from one another. For example, notches may be spaced apart from each other at a given interval of 3", 1.5", etc., with each control blade 110 within the core including the same notch intervals. For example, assume that a control blade 110 has notch positions ranging from "0" to "48". The control blade 110 is in a position deepest in the core when at the notch position "0", and the control blade 110 is in a position furthest out of the core when at the notch position "48". The notch positions between "0" and "48" correspond to varying degrees or depths of control blade insertion, wherein the given interval between adjacent notches is uniform throughout the notches in each of the plurality of control blades 10. For example, if the given notch interval is 3", then changing a control blade 110 from a position of notch "4" to notch "8" moves the control blade further out of the core by 12".

For each sequence, each of the plurality of control blades 110 within the core may move to a lower notch position (i.e., further into the core), a higher notch position (i.e., further out from the core), or the control blade 110 may maintain its position. The determined direction of movement to a higher or lower notch position or non-movement for each of the plurality of control blades 110 may be maintained throughout the duration of the sequence, and generally is not changed until a next sequence. The movements of the control blades 10 may be controlled individually (e.g., each of the control blades 110 may move at a unique notch rate and direction) or in groups (e.g., each control blade 110 in a group of control blades may move at a same notch rate and direction).

In addition to the direction of movement for each of the plurality of control blades 110, a rate at which each of the plurality of control blades 110 may move, referred to as a notch rate, typically remains below a threshold rate during the sequence (e.g., 4 notches per sequence, 5 notches per sequence, etc.). Also, similar to the direction of the control blade 110, the notch rate is generally constant throughout a sequence and may not change until a next sequence.

Alternatively, the notch rate may change within a given sequence. Further, in one embodiment, the notch rate may become zero (e.g., the control blade 110 enters a period of non-movement during the sequence). However, in the above-described embodiments, the notch rate cannot reverse directions. In other words, if at any point during a given sequence a control blade 110 is moving into the core, the control blade 110 cannot move out of the core within the given sequence, and vise versa.

As shown in FIG. 5, the channel walls 104, typically made of Zircaloy, may surround the fuel rods 102 of the fuel bundle 100. The channel walls 104 support the fuel bundle 100 as well as separate coolant flow between fuel bundles 100 in the core. The channel walls 104 may experience above-described channel deformation. Channel bow, which is one example of channel deformation, may be an obstruction to control blade movement in the core. Channel bow refers to an extension of the position of the channel walls 104 either from a bending of the channel walls 104 or a growth of a corrosion layer on the channel walls.

Channel bow is typically caused by two factors; namely, fast neutron fluence and/or shadow corrosion. Fast neutron fluence is the striking of fast neutrons, typically above a given energy level, on the channel walls 104 for a given period of time. Over the period of time, an irradiation growth strain on the channel walls 104, referred to as the accumulated channel wall fast neutron fluence. Fluence may accumulate disproportionately on the channel walls 104. The differential in the fluence accumulated on the opposite faces of channel walls 104, may lead to bow.

Shadow corrosion is where a layer of corrosion (i.e., shadow corrosion) develops on the channel walls 104 based on a proximity of the control blade 110 and the channel walls 104, thereby causing an extension of the channel walls 104 and a possible obstruction to the control blades 110. The corrosion layer increases in response to an increased rate of hydrogen absorption. Platelets (e.g., Zirconium hydride platelets) form when the hydrogen content exceeds a solubility limit (e.g., from the increased rate of hydrogen absorption). The difference in density between the platelets and the normal Zirconium may cause a volume expansion of the corrosion layer on the channel wall surfaces, while channel wall surfaces not in contact with the control blade (e.g., without the higher rate of hydrogen absorption) may not be affected. The increased hydrogen may also affect the normal dislocation density-induced irradiation growth normally experience by the channel walls 104 (e.g., as described above with respect to fast neutron fluence). The differential in the length of the channel (e.g., based on growth on sides in contact with the control blades 110 and no growth or less growth on sides not in contact with the control blades 110) may result in channel bow.

As described above, channel bow is a physical, structural change of the fuel assembly or bundle 100, which may affect various operational factors of the core. For example, a control blade 110 may experience "no settle" conditions, where the control blade 110 cannot be inserted into the core at a required notch rate due to friction between the channel wall and the control blade 110 (e.g., caused by the channel bow). The channel bow may also affect safety thermal margins during operation of the core. Alternatively, the control blade 110 may not reach the "no settle" condition but may still be adversely affected by friction due to channel deformation (e.g., the channel bow) from at least one channel wall 104. These various degrees of friction between the control blade 10 and the channel walls 104 are undesirable during core operation.

Control blade movements for a next cycle of operation may be designated in a proposed operational plan. The proposed operational plan may be generated according to any well-known method. For example, one method of generating the operational plan is through an experience based, trial and error, and iterative process performed by a core designer.

An objective function may be configured for evaluating the new operational plan, as discussed in detail above. However, in this example, at least one of the penalty terms of the objective function takes the level of channel deformation into consideration (e.g., the number of control blades in the core affected by channel deformation). Methods of calculating the amount of channel deformation within a core during operation are well known in the art and will not be described further. These methods may include algorithms for fluence bow calculations, algorithms for shadow bow calculation, algorithms for channel bulge calculations, etc. . . . . Methods of calculating channel deformation at a next cycle of operation typically require the current operational plan, a proposed operational plan, and the current conditions (e.g., channel deformation levels) within the core.

With respect to configuring the objective function, the user may select the penalty weight associated with the channel deformation constraint from among a set of predetermined penalty weights. For example, as above described with reference to the embodiment shown in FIG. 3, the user may set an importance 56 for each optimization constraint 50. In the importance field 58 for an optimization constraint, the user has an enumerated set of pull down options of minute, low, nominal, high and extreme. The enumerated list of options is mapped to a set of weighting factors, utilized in the objective function, that reflect the qualitative description. In this case, at least one of the optimization constraints may based on a channel deformation criteria (e.g., the number of control blades affected by channel deformation).

In the example where the channel deformation criteria is a number of control blades affected by channel deformation, the calculation of this number may be performed manually by the core designer and/or may be automated with a processing device, such as a simulator. This number may then serve as a penalty term that is then multiplied with the selected penalty weight in the objective function.

Once the above-selections have been completed, the processor 14 configures the objective function according to the generic definition discussed above and the selections made during the selection process. The resulting configured objective function equals the sum of credit components associated with the selected optimization parameters plus the sum of penalty components associated with the selected optimization constraints.

Accordingly, the above-described process of constraint optimization, including a consideration of a channel deformation criteria, may be used as a tool. Referring again to FIG. 1 for the purposes of explanation only, an individual desiring to apply an objective function according to example embodiments of the present invention accesses the server 10 via input 18, computer 26 or computer 22. The user then configures an objective function as described above; for example, the user accesses a previously stored configured objective function or configures the objective function through data entry. The user then supplies the values for the input variables of the objective function, and receives an objective function result. The user can perform this operation for different candidate solutions to obtain figures of merit regarding the solutions. In this manner, the user treats the objective function as a tool in determining a solution to the optimization problem.

Using the configured objective function, an optimization process such as described above with respect to FIG. 4 may be performed. Referring to FIG. 4, each candidate solution generated in S12 may result in a different operational plan. The optimization process may advance through steps S14, S16, S18 and back to S12 recursively until step S16 determines convergence for a generated candidate solution (i.e., operational plan).

The invention being thus described, it will be obvious that the same may be varied in many ways. For example, while above-described example embodiments are directed to channel bow, it is understood that other example embodiments may be directed to any type of channel deformation constraint (e.g., bow, twist, bulge, etc. . . . ) Such variations are not to be regarded as a departure from the spirit and scope of the invention, and all such modifications as would be obvious to one skilled in the art are intended to be included within the scope of the following claims.

We claim:

1. A method of evaluating proposed solutions to a nuclear reactor constraint problem, comprising:
    providing an objective function definition generic to a constraint problem,
    configuring the generic objective function into a nuclear reactor constraint problem objective function having channel deformation of control blades as a constraint,
        the nuclear reactor constraint problem objective function being a sum of optimization parameters and constraint parameters,
        each optimization parameter including a multiple of a credit term and an associated credit weight, the credit term being a numerical value associated with the optimization parameter, the credit weight being a numerical value corresponding to a relative importance of the associated credit term,
        each constraint parameter including a multiple of a penalty term and an associated penalty weight, the penalty term being a numerical value associated with a violation of a constraint, at least one penalty term including a summation of a number of control blades affected by the channel deformation, the penalty weight being a numerical value corresponding to a relative importance of the associated penalty term, at least one penalty weight being a numerical value corresponding to a relative importance of the control blades affected by the channel deformation, the channel deformation being at least one of bowing, bulging and twisting of a channel,
    the channel having walls surrounding a fuel bundle;
    receiving, for each proposed solution to the nuclear reactor constraint problem, a value of at least one variable in at least one credit term in the configured objective function at the processor, the credit term variable being related to the proposed solution;
    receiving, for each proposed solution to the nuclear reactor constraint problem, a value of at least one variable in at least one penalty term in the configured objective function at the processor, the penalty term variable being related to the proposed solution;
    generating, using the processor, a figure of merit for each of the proposed solutions to the nuclear reactor constraint problem based on the credit term variable and the penalty term variable using the configured objective function; and
    determining a desired one of the proposed solutions to the nuclear reactor constraint problem based on the generated figures of merit.

2. The method of claim 1, further comprising:
    implementing the desired proposed solution to the nuclear reactor constraint problem, based on the evaluation, in order to optimize performance of the nuclear reactor, the determining the desired one of the proposed solutions being accomplished by using the figures of merit to evaluate the relative strength of the proposed solutions.

3. A method of evaluating proposed solutions to a nuclear reactor constraint problem, comprising:
    providing an objective function definition generic to a constraint problem,
    configuring the generic objective function into an application specific objective function having channel deformation of control blades as a constraint,
        the application specific objective function being a sum of optimization parameters and constraint parameters
        each optimization parameter including a multiple of a credit term and an associated credit weight, the credit term being a numerical value associated with the optimization parameter, the credit weight being a numerical value corresponding to a relative importance of the associated credit term,
        each constraint parameter including a multiple of a penalty term and an associated penalty weight, the penalty term being a numerical value associated with a violation of a constraint, at least one penalty term including a summation of a number of control blades affected by the channel deformation, the penalty weight being a numerical value corresponding to a relative importance of the associated penalty term, at least one penalty weight being a numerical value corresponding to a relative importance of the control blades affected by the channel deformation, the channel deformation being at least one of bowing, bulging and twisting of a channel, the channel having walls surrounding a fuel bundle;

generating, using the processor, a figure of merit for each of the proposed solutions to the nuclear reactor constraint problem based on the credit term variable and the penalty term variable using the application specific objective function; and determining a desired one of the proposed solutions to the nuclear reactor constraint problem based on the generated figure of merit.

4. The method of claim 3, further comprising:

implementing the desired proposed solution to the nuclear reactor constraint problem, based on the evaluation in order, to optimize performance of the nuclear reactor, the determining the desired one of the proposed solutions being accomplished by using the figures of merit to evaluate the relative strength of the proposed solutions.

5. An apparatus for evaluating proposed solutions to a nuclear reactor constraint problem, comprising:

a memory storing an application specific objective function configured based on a generic objective function definition generic to a constraint problem, the application specific objective function having channel deformation of control blades as a constraint, the application specific objective function definition being a sum of optimization parameters and constraint terms, each optimization parameter including a multiple of a credit term and an associated credit weight, the credit term being a numerical value associated with the optimization parameter, the credit weight being a numerical value corresponding to a relative importance of the associated credit term, each constraint parameter including a multiple of a penalty term and an associated penalty weight, the penalty term being a numerical value associated with a violation of a constraint, at least one penalty term including a summation of a number of control blades affected by the channel deformation, the penalty weight being a numerical value corresponding to a relative importance of the associated penalty term, at least one penalty weight being a numerical value corresponding to a relative importance of the control blades affected by the channel deformation based on criteria for channel deformation, the channel deformation being at least one of bowing, bulging and twisting of a channel, the channel having walls surrounding a fuel bundle;

an interface receiving, for each proposed solution to the nuclear reactor constraint problem, a value of at least one variable in at least one credit term of the application specific objective function and receiving a value of at least one variable in at least one penalty term of the application specific objective function, the credit term variable and the penalty term variable being related to the proposed solution; and a processor generating a figure of merit for each of the proposed solutions to the nuclear reactor constraint problem based on the credit term variable and the penalty term variable using the application specific objective function, the processor configured to determine a desired one of the proposed solutions to the nuclear reactor constraint problem based on the generated figures of merit.

6. The apparatus of claim 5, wherein the processor is further configured to implement the desired proposed solution to the nuclear reactor constraint problem, based on the evaluation, in order to optimize performance of the nuclear reactor, the processor configured to determine the desired one of the proposed solutions by using the figures of merit to evaluate the relative strength of the proposed solutions.

7. A method of generating a solution to an optimization problem, comprising:

generating, using a processor, candidate solutions to a nuclear reactor constraint problem;

generating, using the processor, objective function values using a configured objective function, the configured objective function being configured from an objective function definition generic to the constraint problem, the configured objective function having channel deformation of control blades as a constraint, the configured objective function being a sum of optimization parameters and constraint parameters, each optimization parameter including a multiple of a credit term and an associated credit weight, the credit term being a numerical value associated with the optimization parameter, the credit weight being a numerical value corresponding to a relative importance of associated credit terms, each constraint parameter including a multiple of a penalty term and an associated penalty weight, the penalty term being a numerical value associated with a violation of a constraint, at least one penalty term including a summation of a number of control blades affected by the channel deformation, the penalty weight being a numerical value corresponding to a relative importance of the associated penalty term, at least one penalty weight being a numerical value corresponding to a relative importance of the control blades affected by the channel deformation, the channel deformation being at least one of bowing, bulging and twisting of a channel, the channel having walls surrounding a fuel bundle; and assessing convergence on a desired solution to the nuclear reactor constraint problem based on the objective function values.

8. The method of claim 7, further comprising:

implementing the desired solution, based on the assessment, if the objective function value is acceptable, the assessing the convergence on the desired solution including determining a strength of the candidate solutions by evaluating the objective function values.

9. A method of configuring an objective function and implementing proposed solution, the method automated by a processor, comprising:

providing an objective function configured for a constraint problem, the objective function being a sum of optimization parameters and constraint parameters, each optimization parameter including a multiple of a credit term and an associated credit weight, the credit term being a numerical value associated with the optimization parameter, the credit weight being a numerical value corresponding to a relative importance of the associated credit term, each constraint parameter including a multiple of a penalty term and an associated penalty weight, the penalty term being a numerical value associated with a violation of a constraint, at least one penalty term including a summation of a number of control blades affected by the channel deformation, the penalty weight being a numerical value corresponding to a relative importance of the associated penalty term, at least one penalty weight being a numerical value corresponding to a relative importance of the control blades affected by the channel deformation;

defining the credit terms based on user input, the channel deformation being at least one of bowing, bulging and twisting of a channel, the channel having walls surrounding a fuel bundle;

generating a merit based on the credit term and penalty term using the objective function; and implementing a proposed solution, if the figure of merit is acceptable.

* * * * *